United States Patent
Sekiya et al.

(10) Patent No.: US 7,474,854 B2
(45) Date of Patent: Jan. 6, 2009

(54) OPTICAL TRANSMISSION SYSTEM

(75) Inventors: Motoyoshi Sekiya, Kawasaki (JP); Ryosuke Goto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 562 days.

(21) Appl. No.: 10/731,266

(22) Filed: Dec. 9, 2003

(65) Prior Publication Data

US 2004/0136728 A1    Jul. 15, 2004

(30) Foreign Application Priority Data

Jan. 15, 2003    (JP)    ............................. 2003-007265

(51) Int. Cl.
   *H04J 14/02*    (2006.01)
(52) U.S. Cl. ......................................... 398/95; 398/97
(58) Field of Classification Search .................. 398/33, 398/204, 206, 197, 85, 93, 97
   See application file for complete search history.

(56) References Cited

U.S. PATENT DOCUMENTS

| | | | | |
|---|---|---|---|---|
| 5,696,859 | A * | 12/1997 | Onaka et al. ................... 385/24 |
| 5,896,211 | A * | 4/1999 | Watanabe ....................... 398/76 |
| 6,282,017 | B1 * | 8/2001 | Kinoshita ................. 359/341.42 |
| 6,335,810 | B1 * | 1/2002 | Uehara ......................... 398/48 |
| 6,633,430 | B1 * | 10/2003 | Monnard et al. ......... 359/337.11 |
| 7,116,908 | B2 * | 10/2006 | Uda et al. ....................... 398/94 |
| 2002/0135842 | A1 * | 9/2002 | Zarris et al. ................. 359/161 |

FOREIGN PATENT DOCUMENTS

| | | |
|---|---|---|
| JP | 63198426 | 8/1988 |
| JP | 4014917 | 1/1992 |
| JP | 10173266 | 6/1998 |
| JP | 10209973 | 8/1998 |
| JP | 10-276173 | 10/1998 |
| JP | 11094701 | 4/1999 |
| JP | 200209160 | 7/2000 |
| JP | 2002290331 | 10/2002 |

OTHER PUBLICATIONS

Notification of Reason(s) for Refusal, dated Dec. 18, 2007 for corresponding Japanese Application JP 2003-007265.

* cited by examiner

*Primary Examiner*—Leslie Pascal
(74) *Attorney, Agent, or Firm*—Katten Muchin Rosenman LLP (57) ABSTRACT

In an optical transmission system which can keep a flat pass characteristic within an optical signal modulation band, a spectrum of a dropped optical signal within a modulation band per channel is monitored, and non-flatness for the optical signal is compensated by detecting the non-flatness of a pass characteristic of a transmission line from the spectrum.

10 Claims, 13 Drawing Sheets

PRIOR ART

OPTICAL TRANSMISSION SYSTEM

BACKGROUND OF THE INVENTION

1. Field of the Invention

The present invention relates to an optical transmission system, and in particular to a wavelength division multiplexing (WDM) optical transmission system.

In the wavelength multiplexing optical transmission system, not only an optical transmission between a transmission end and a reception end, but also an OADM (Optical Add/Drop Multiplexer) function of adding/dropping (inserting/branching) a part of a signal kept in an optical state at intermediate nodes is required for structuring a flexible optical network at low cost.

2. Description of the Related Art

Figure 12A:
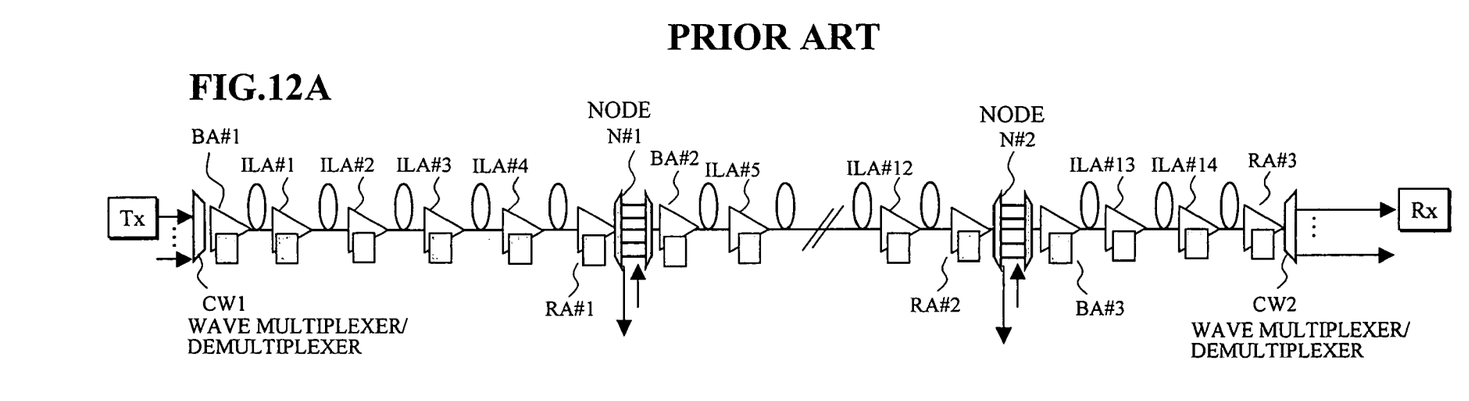
FIGS. 12A and 12B are diagrams for illustrating the prior art optical transmission system.

FIG. 12A shows a prior art example of such an optical network. Namely, relay nodes (Back-to-Back terminals having add/drop function) N#1 and N#2 are connected between a transmitter Tx and a receiver Rx. An optical signal is relayed and amplified in a transmission line between the transmitter Tx and the relay node N#1, the relay nodes N#1 and N#2, and the relay node N#2 and the receiver Rx by passing through booster amplifiers BA#1-BA#3, linear optical amplifying relays ILA (InLine Amplifiers) #1-#14, and reception amplifiers RA#1-RA#3 as shown in FIG. 12A.

At a transmission end, a wave multiplexer (wave multiplexer/demultiplexer) CW1 multiplexes channel signals having different wavelengths from the transmitter Tx, thereby performing wavelength multiplexing. At a reception end, a wave demultiplexer (wave multiplexer/demultiplexer) CW2 demultiplexes channel signals from the wavelength-multiplexed optical signal to be provided to the receiver Rx.

Also, between the transmitter Tx and the receiver Rx, optical signals of some channels are dropped/added as they are, or passed through as they are at the relay nodes N#1 and N#2.

Thus, in a wavelength multiplexing optical transmission system, optical parts such as wave multiplexers/demultiplexers and optical amplifiers are connected between the transmitter Tx and the receiver Rx. Since a level difference (tilt) between the channel signals influences a transmission quality, the Japanese Patent Application Laid-open No. 10-276173 has proposed a method by which the wave-multiplexed optical signal is monitored, an attenuation of a variable optical attenuator per channel arranged before wave multiplexing is adjusted based on a result of a level measurement by a tunable filter, and inter-level deviations of the channel signals are adjusted.

[Patent Document 1]

Japanese Patent Application Laid-Open No. 10-276173 (Abstract, FIG. 1)

Figure 12B:
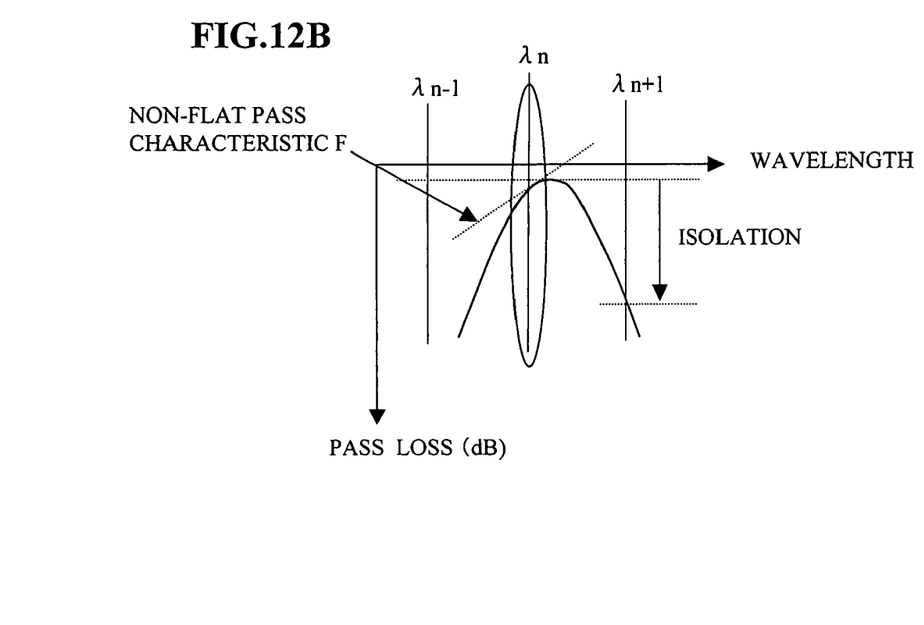

On the other hand, when a pass characteristic from the transmission end where the transmitter Tx is arranged to the reception end where the receiver Rx is arranged is measured in the optical network shown in FIG. 12A, with attention to a certain wavelength $\lambda n$ within the wavelength-multiplexed optical signals, as shown in FIG. 12B, a transmission line pass loss assumes the minimum at the point deviated toward e.g. the right side from a wavelength $\lambda n$ within a modulation band of the optical signal wavelength. Therefore, the transmission line pass characteristic (tangent line) F tilts at a center wavelength $\lambda n$ and is not flat, thereby deteriorating the transmission quality.

Figures 13A, 13B, 13C, 13D, 13E:
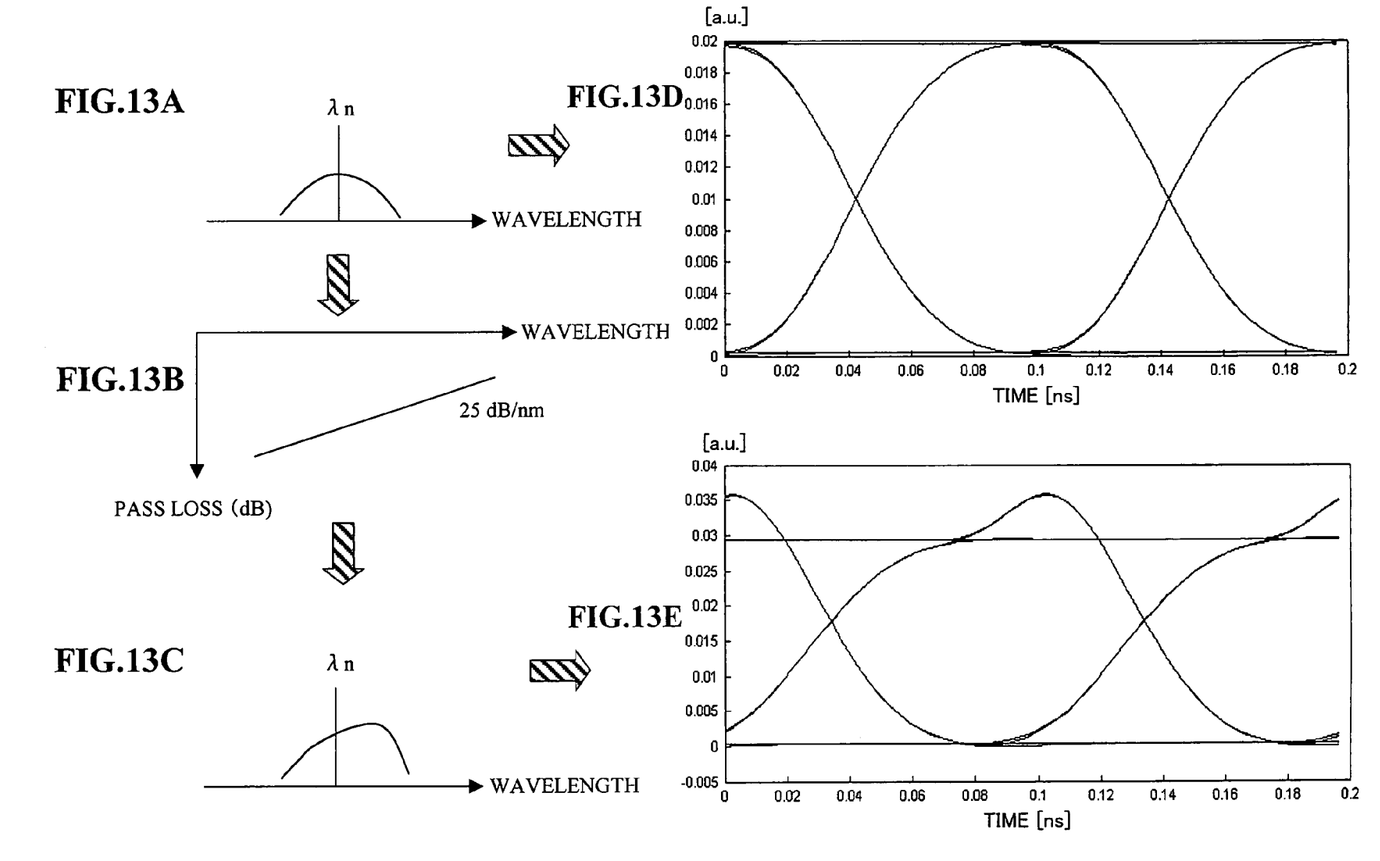
FIGS. 13A-13E are diagrams for illustrating a problem of the prior art shown in FIGS. 12A and 12B.

This will now be further described referring to FIGS. 13A-13E. If the pass characteristic is flat from the transmission end to the reception end as mentioned above, a symmetric modulation spectrum with respect to the center wavelength $\lambda n$ is given, as shown in FIG. 13A. However, when a non-flat pass characteristic having a fixed gradient angle as shown in FIGS. 12B and 13B occurs, a modulation spectrum is not symmetric but distorted as shown in FIG. 13C.

As a result, when the modulation spectrum is normal as shown in FIG. 13A, a wide distortionless eye pattern can be obtained as shown in FIG. 13D. However, when the modulation spectrum is distorted as shown in FIG. 13C, the eye pattern is also distorted as shown in FIG. 13E, thereby causing a signal error.

As for such non-flatness of the transmission line pass characteristic within the modulation band, it is required especially in the wave multiplexer/demultiplexer that the pass characteristic of the signal wavelength band is flat, channel signals of other wavelengths are fully suppressed, and isolation shown in FIG. 12B is secured. However, since the wavelength multiplexing optical transmission system with a narrow wavelength interval and a high density is adopted in order to increase a transmission capacity as mentioned above, both become hardly compatible together with the wavelength interval narrowed. Also, by interposition of the add/drop node, the number of optical parts through which the optical signals pass increases, and the non-flat pass characteristic within the modulation band is weighted and becomes serious.

Such non-flatness of the pass characteristic depends on individual characteristics of parts and relative relationships between wavelengths of the optical signals and the pass characteristic of the parts, giving no specific characteristic, so that such a problem has been usually addressed by making part specifications strict, limiting the number of parts passed therethrough, or allowing a transmission quality deterioration (penalty).

SUMMARY OF THE INVENTION

It is accordingly an object of the present invention to provide an optical transmission system which can keep a flat transmission line pass characteristic within an optical signal modulation band considering the above -mentioned problem.

In order to achieve the above-mentioned object, an optical transmission system according to the present invention comprises: a drop portion for dropping an optical signal; a monitor for monitoring a spectrum of the dropped optical signal within a modulation band per channel; a controller for detecting non-flatness of a pass characteristic of a transmission line from the spectrum; and a compensator for compensating the non-flatness for the optical signal.

Namely, in the present invention, a monitor monitors a spectrum of an optical signal dropped by a drop portion within a modulation band per channel.

A controller detects whether or not the spectrum monitored by the monitor indicates flatness of a pass characteristic of a transmission line, and when non-flatness is exhibited, a compensator compensates the non-flatness for the optical signal.

Thus, since the pass characteristic of the transmission line within the modulation band of the signal per channel is made flat in the present invention, a deterioration of a transmission quality based on a wavelength distortion of optical spectrum can be avoided.

The above-mentioned compensator may be provided on a reception side or a transmission side of the optical signal.

Also, an optical spectrum analyzer may be adopted for the above-mentioned monitor, and the above-mentioned controller may detect the non-flatness by determining a linear gradient of a spectrum around a peak wavelength, determined by sweeping the optical spectrum analyzer.

Namely, in case of the non-flatness characteristic, optical powers of a fixed width from a center wavelength are different, and a linear gradient is provided. Therefore, this linear gradient may be determined as the non-flatness of the above-mentioned pass characteristic.

Also, the above-mentioned monitor may be composed of a coupler for further dropping the optical signal from the drop portion, two tunable filters for sweeping the optical signal from the coupler and for respectively extracting an optical signal component a fixed wavelength width apart around a peak wavelength, and two photo diodes for detecting power of an output optical signal of the tunable filters to be provided to the controller.

In this invention, two tunable filters are substituted for the above-mentioned optical spectrum analyzer.

The above-mentioned arrangement may further comprise a modulator, on a transmission side, for applying to the optical signal an intensity modulation of a predetermined frequency for monitoring, the above-mentioned tunable filters may be set to extract an optical signal component the fixed wavelength width corresponding to the predetermined frequency apart from the peak wavelength.

Namely, the optical spectrum is determined for whatever reception signal in the above-mentioned arrangement. However, when a monitoring signals are transmitted on the transmission side, and the above-mentioned two tunable filters detect the signals, optical signal components, with higher accuracy, a fixed wavelength width apart from a peak wavelength can be extracted.

Furthermore, the above-mentioned arrangement may further comprise a modulator, on a transmission side, for applying to the optical signal an intensity modulation of a predetermined frequency for monitoring, a laser diode may be connected to the drop portion to perform a heterodyne detection, the monitor may be composed of a photo diode for inputting an optical signal, from the drop portion, of a wavelength detected by a heterodyne detection, and an electric spectrum analyzer for determining powers of at least two electric signals a fixed frequency width apart around a peak frequency determined by sweeping an electric signal outputted from the photo diode, to be provided to the controller.

In this case, instead of detecting the optical spectrum by using the above-mentioned optical spectrum analyzer, an optical signal is converted into an electric signal, an electric spectrum is determined by an electric spectrum analyzer, and accordingly the non-flatness of the pass characteristic is determined.

Also, the above-mentioned arrangement may further comprise a modulator, on a transmission side, for applying to the optical signal an intensity modulation of a predetermined frequency for monitoring, a laser diode may be connected to the drop portion to perform a heterodyne detection, the monitor may be composed of a photo diode for inputting an optical signal, from the drop portion, of a wavelength detected by a heterodyne detection, two electric filters for respectively extracting an electric signal component a fixed frequency width apart around a peak frequency determined by sweeping an electric signal outputted from the photo diode, and two wattmeters for determining powers of output signals from the electric filters to be provided to the controller.

In this invention, instead of the above-mentioned electric spectrum analyzer, two electric filters are used.

As the above-mentioned monitor, a comparator for detecting an output level difference between the photo diodes may be included, and the controller may control the compensator so that an output level of the comparator assumes zero.

Also, the above-mentioned reception side may comprise an arbitrary intermediate node, and need not be a reception end where a receiver exists.

Also, as the above-mentioned compensator, a variable pass characteristic compensator may be used.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
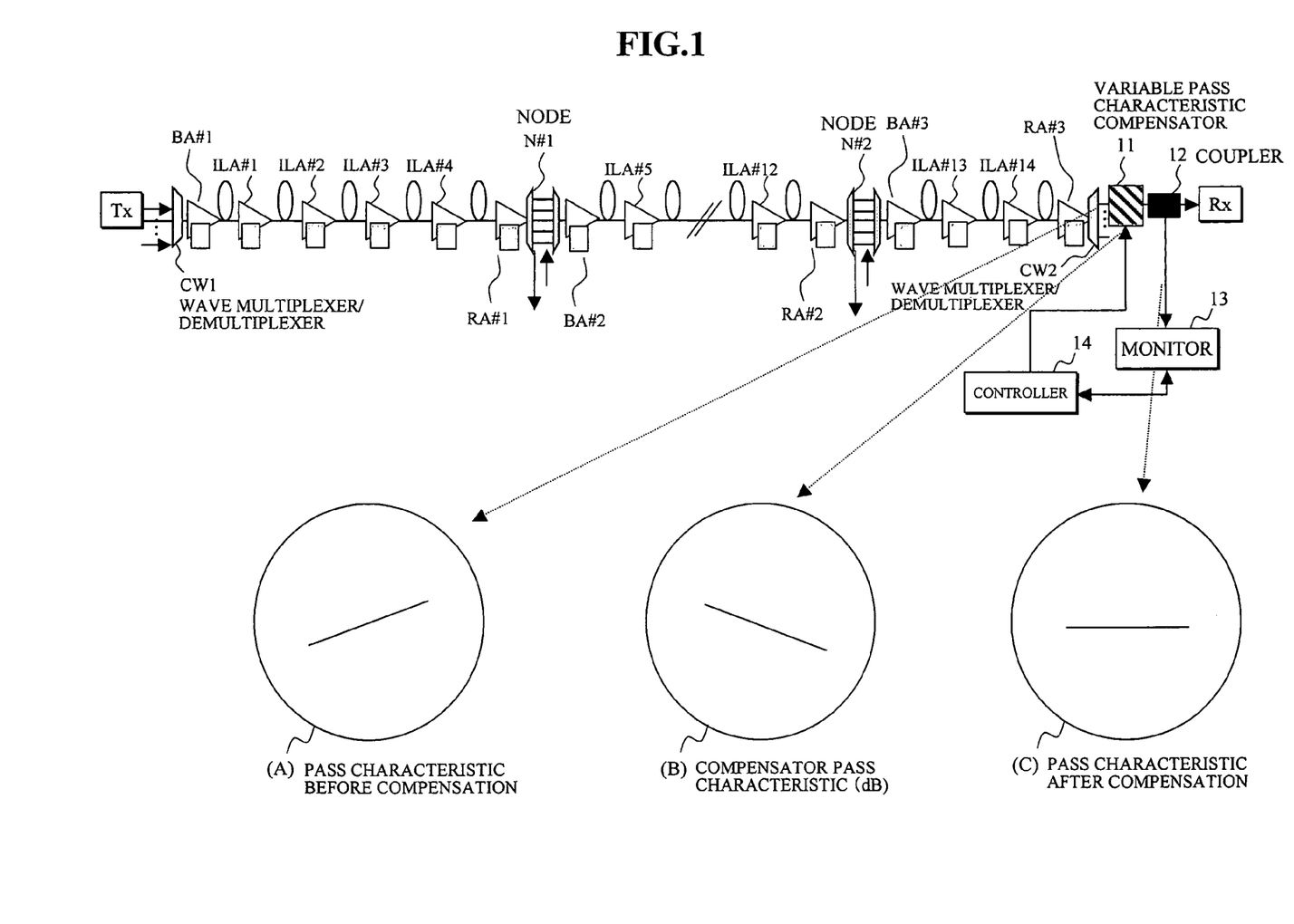
FIG. 1 is a diagram showing an embodiment [1] of an optical transmission system according to the present invention.

FIG. 1 shows an embodiment [1] of an optical transmission system according to the present invention. In this embodiment [1], the prior art arrangement shown in FIG. 12A is used, and a following arrangement is added; a variable pass characteristic compensator 11 composing a compensator and a coupler 12 composing a drop portion are connected in series between the demultiplexer CW2 and the receiver Rx, and an optical signal dropped by the coupler 12 is provided to a monitor 13, which provides a monitor output to a controller 14 by receiving a control of the controller 14, whereby the controller 14 controls the variable pass characteristic compensator 11.

It is to be noted that while the arrangement comprising the variable pass characteristic compensator 11, the coupler 12, the monitor 13, and the controller 14 is adopted for the optical signal demultiplexed by the demultiplexer CW2 per channel, only an arrangement for a single channel is shown in FIG. 1 for simplification's sake of the figure.

More specifically, an optical spectrum before being inputted to the variable pass characteristic compensator 11, i.e. before compensation in the embodiment [1] has an upward non-flat transmission line pass characteristic (A) shown in FIG. 1 (F in FIG. 12B). When the monitor 13 monitors this characteristic and the controller 14 determines that the pass characteristic is non-flat from the optical spectrum of the concerned channel based on the monitor result, the controller 14 controls the variable pass characteristic compensator 11 to obtain a compensator pass characteristic (B) shown in FIG. 1. As a result of the combining the pass characteristics (A) with (B) in FIG. 1, a flat pass characteristic after compensation (C) shown in FIG. 1 can be obtained.

Thus, the optical spectrum within the modulation band becomes a normal state without distortion.

Figure 2:
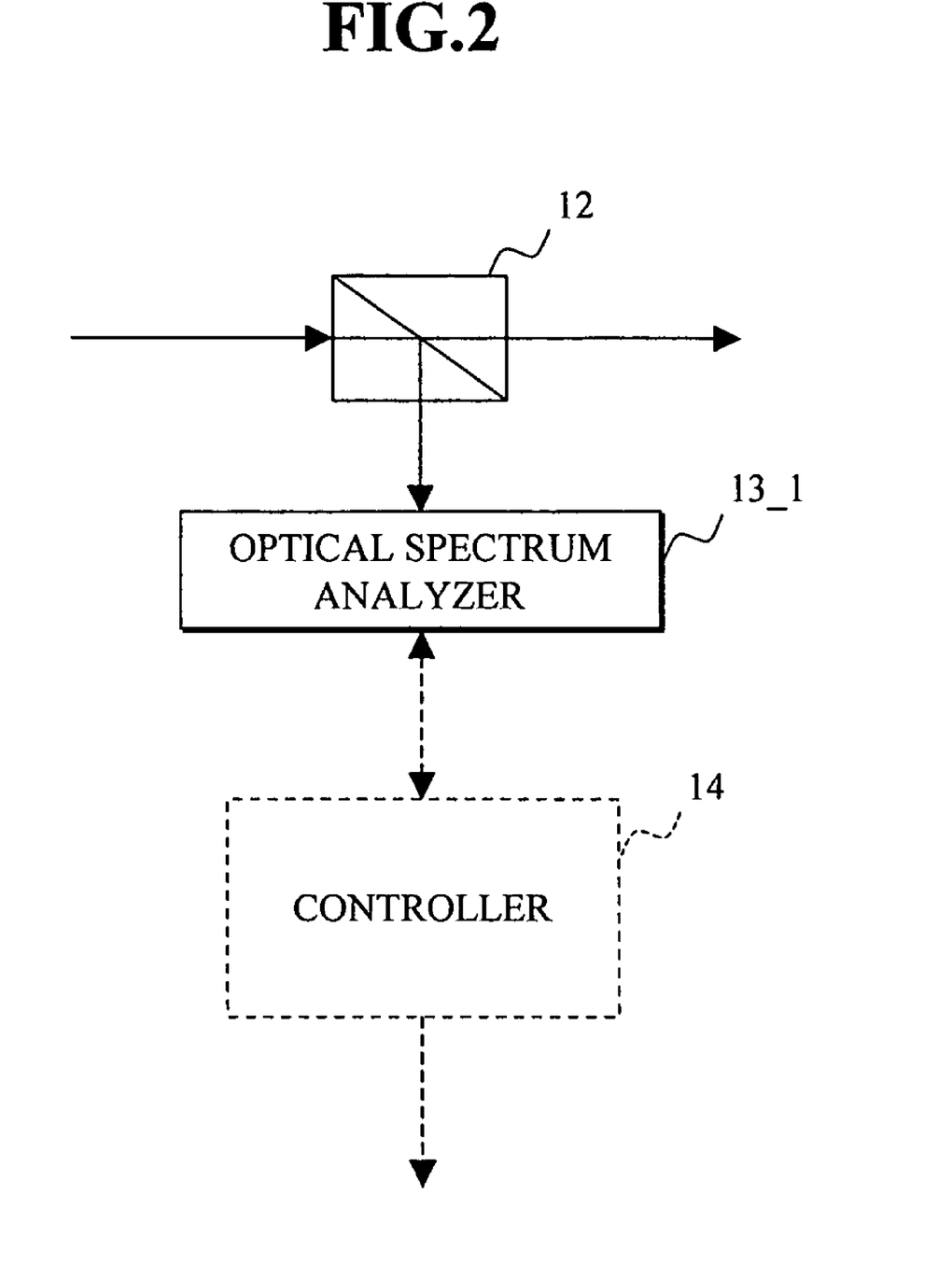
FIG. 2 is a block diagram showing an embodiment (1) of a monitor used for an optical transmission system according to the present invention.

FIG. 2 shows an embodiment (1) of the monitor 13 shown in FIG. 1. In this embodiment, an optical spectrum analyzer 13_1 is used as the monitor 13. Operations for compensating the non-flatness of the pass characteristic within the modulation band by using such an optical spectrum analyzer will now be described referring to FIGS. 3A-3D.

Firstly, the optical spectrum analyzer 13_1 inputs the optical signal dropped by the coupler 12, and the optical spectrum is swept by the control of the controller 14. As the sweep result, the controller 14 detects a peak wavelength $\lambda 0$ shown in FIG. 3A.

Figure 3A:
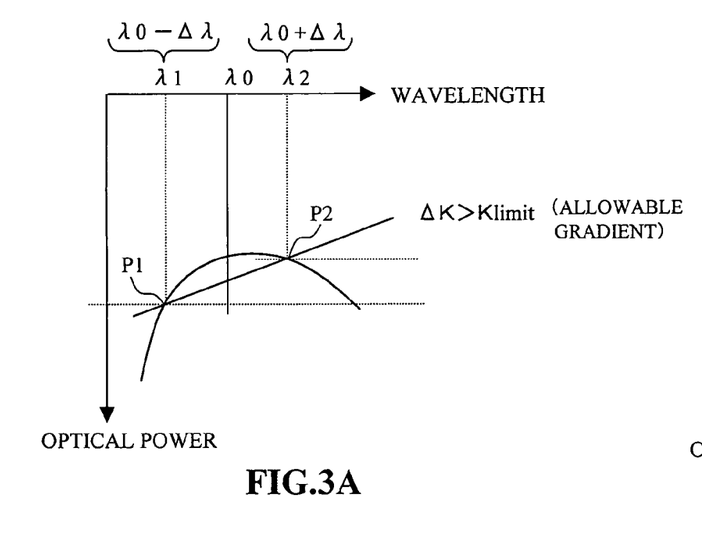
FIGS. 3A-3D are diagrams showing a gradient measurement of a spectrum and a calculation example of a compensation amount in the monitor shown in FIG. 2.

The controller 14 having detected this peak wavelength $\lambda 0$ measures optical spectrum intensities (optical powers) of wavelengths $\lambda 1$ and $\lambda 2$ a fixed wavelength width $\lambda 0$ apart around the peak wavelength $\lambda 0$. The powers in this case are made P1 and P2.

The controller 14 determines a linear gradient of the optical spectrum from the powers P1 and P2 with the following equation.

$$\Delta K = (P1-P2)/2\Delta\lambda \text{(dB/nm)} \qquad \text{Eq. (1)}$$

The linear gradient $\Delta K$ thus determined is compared with an allowable value Klimit shown in FIG. 3A. If it is larger than the allowable value ($|\Delta K|$>Klimit), a compensation amount is determined as follows. However, if the value is equal to or less than the allowable value Klimit (FIG. 3D also corresponds to this case), no more control is performed.

If the linear gradient $\Delta K$ is larger than the allowable Klimit, the controller 14 determines $-\Delta K$ as a compensation amount to be compensated at the variable pass characteristic compensator 11. The pass characteristic of the compensator 11 at this time is shown in FIG. 3C.

Accordingly, the controller 14 may control the compensator 11 to generate the linear gradient of the compensation amount $-\Delta K$.

Figure 3B:
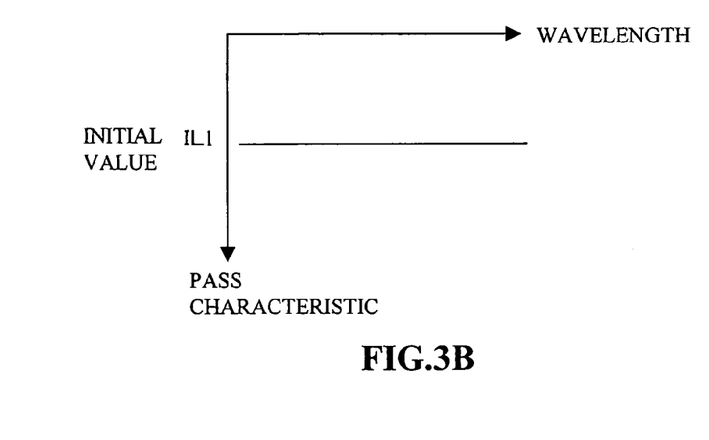
Figure 3C:
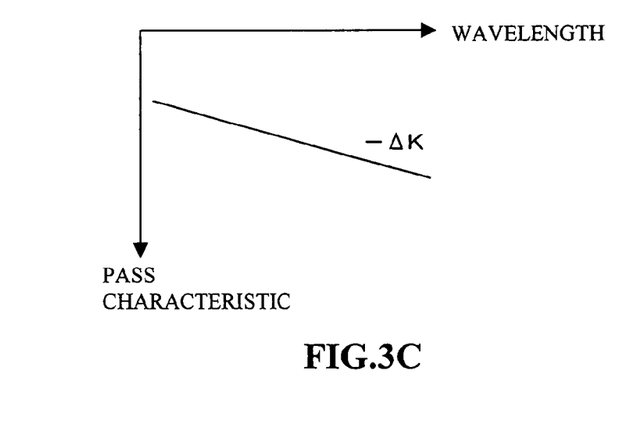
Figure 3D:
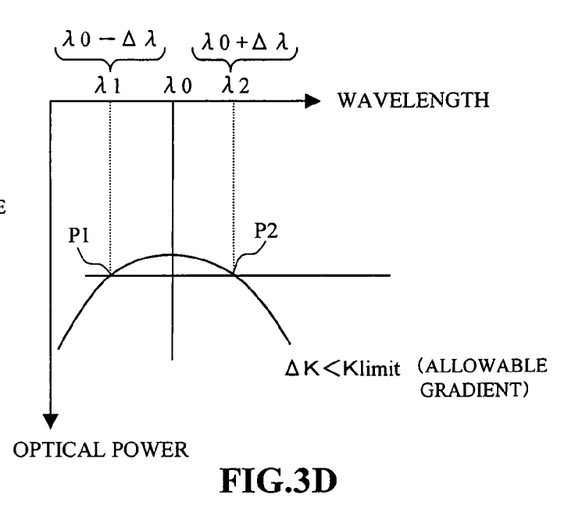

In this case, the pass characteristic of the variable pass characteristic compensator 11 has a flat characteristic of an initial value IL1 as shown in FIG. 3B. Therefore, if the controller 14 controls the compensator 11 to have such a pass characteristic as shown in FIG. 3C, the pass characteristic after compensation resultantly assumes flat, and can obtain the optical spectrum without distortions as shown in FIG. 3D.

Figure 4A:
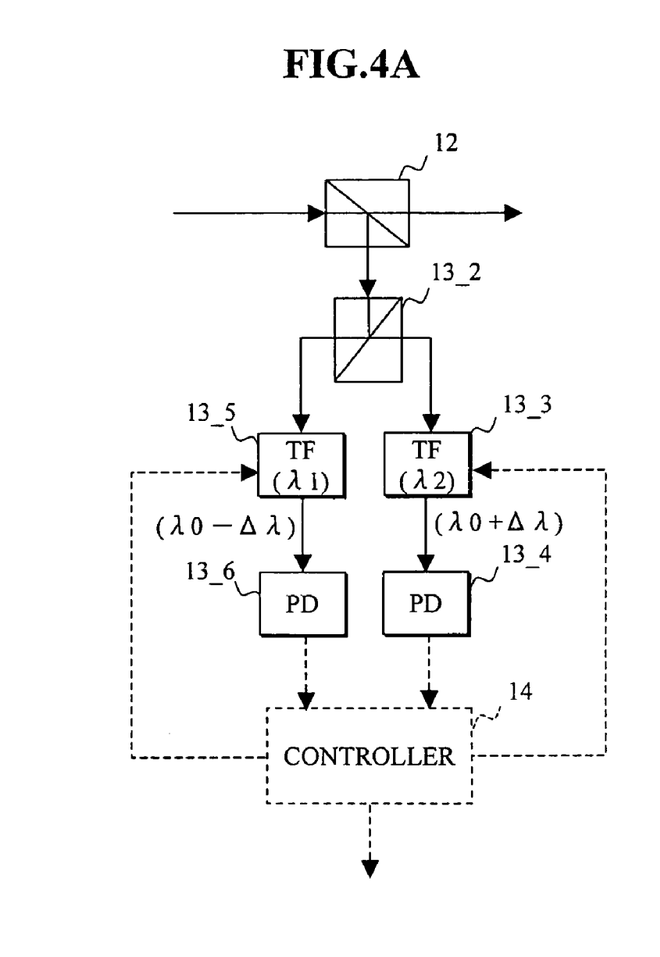
FIGS. 4A and 4B are diagrams showing an embodiment (2) of a monitor used for an optical transmission system according to the present invention.
Figure 4B:
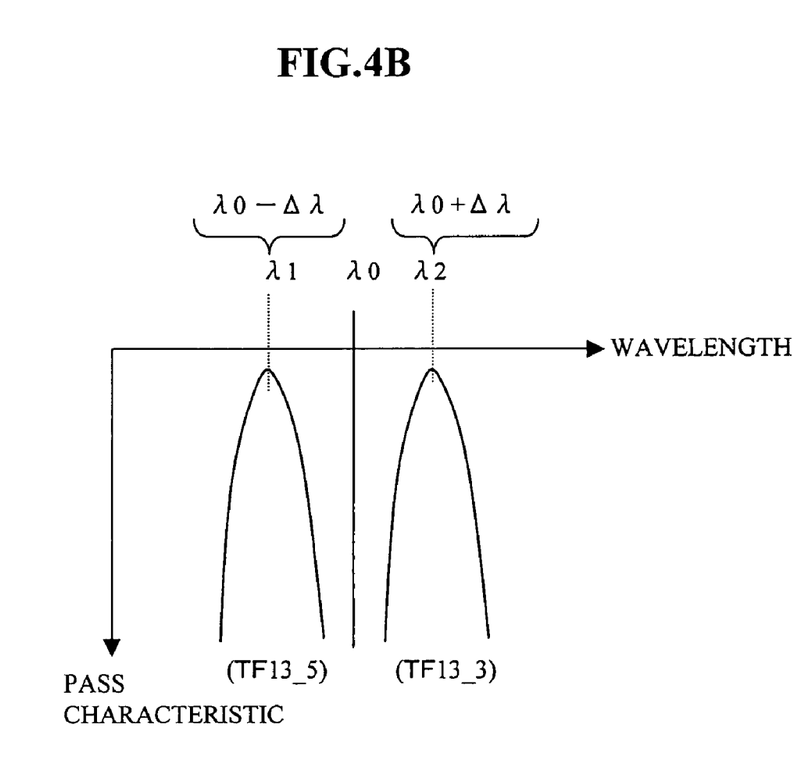

FIGS. 4A and 4B show an embodiment (2) of the monitor 13 shown in FIG. 1. In this embodiment, as shown in FIG. 4A, a coupler 13_2 is provided for further dropping the optical signal dropped by the coupler 12 into two signals. This embodiment is composed of tunable filters (TF) 13_3 and 13_5 for inputting the two optical signals outputted from the coupler 13_2 and for extracting the optical signal components of the wavelengths $\lambda 2$ and $\lambda 1$ as shown in FIG. 4B, and photo diodes (PD) 13_4 and 13_6 for converting the optical output signals of the optical filters 13_3 and 13_5 into electric signals.

It is to be noted that the output signals of these photo diodes 13_4 and 13_6, as shown by dotted lines, are transmitted to the controller 14 and the optical filters 13_3 and 13_5 are connected to be controlled by the controller 14.

Operations of such a monitor in the embodiment (2) will now be described referring to FIGS. 5A and 5B.

Firstly, the tunable filters 13_3 and 13_5 input the optical signals from the coupler 13_2, and respectively detect the peak wavelength $\lambda 0$ under the control of the controller. 14.

Figure 5A:
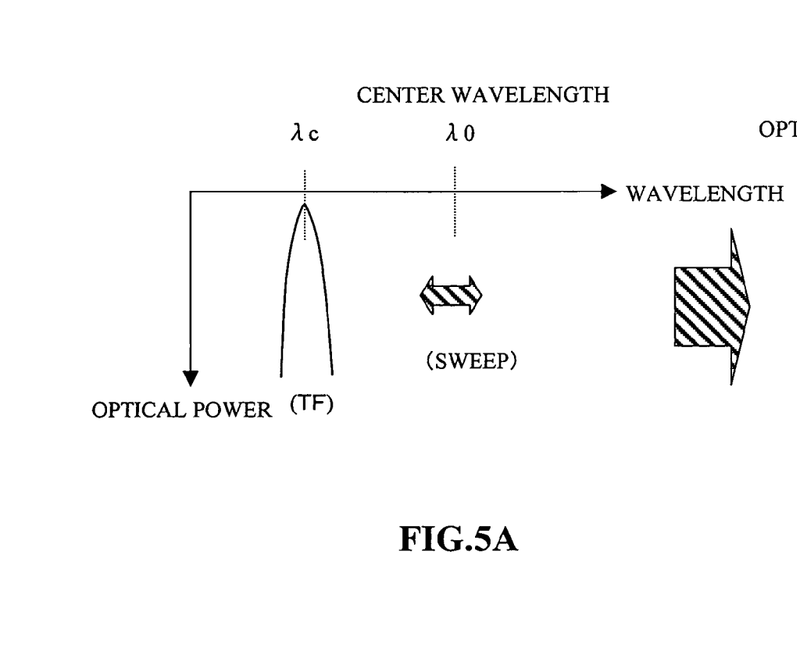
FIGS. 5A and 5B are diagrams for illustrating a detection example of a center wavelength in a monitor used for an optical transmission system according to the present invention.
Figure 5B:
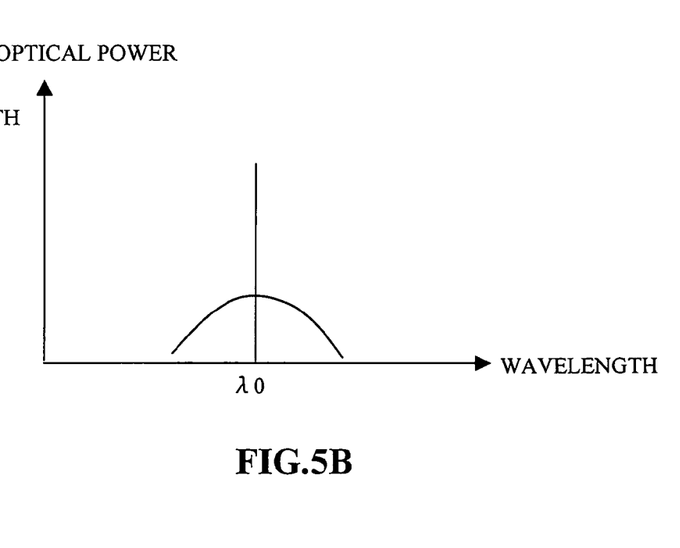

For this reason, as shown in FIG. 5A, the controller 14 performs a sweep control to a filtering center wavelength $\lambda c$ of the optical filters 13_3 and 13_5 from a shorter wavelength side or a longer wavelength side. For a NRZ (NonReturn to Zero) modulation, the spectrum of the optical signal indicates a maximum power at the center wavelength $\lambda 0$ as shown in FIG. 5B. Therefore, this maximum power is measured at the optical filters 13_3 and 13_5.

Accordingly, both of the optical filters 13_3 and 13_5 commonly detect the peak wavelength $\lambda 0$. However, since powers at the wavelength $\lambda 0 \pm \Delta\lambda$ are now required, the controller 14 performs the sweep control to the optical filter 13_3 to extract the optical signal component at the wavelength $\lambda 2$ which is $\Delta\lambda$ apart from the center wavelength $\lambda 0$ as shown in FIG. 4B toward the longer wavelength side, and performs the sweep control to the optical filter 13_5 to extract the optical signal component which is $\Delta\lambda$ apart from the center wavelength $\lambda 0$ toward the shorter side oppositely.

As a result, the optical signal components at the wavelength $\lambda 2$ from the optical filter 13_3 and the wavelength $\lambda 1$ from the optical filter 13_5 are inputted respectively to the photo diodes 13_4 and 13_6, which respectively output the electric signals corresponding to the input levels to the controller 14.

As a result, assuming that the output powers of the photo diodes 13_4 and 13_6 are P1 and P2 in the same way as the embodiment (1) of FIG. 2, the controller 14 determines the linear gradient $\Delta K$ of the optical spectrum in the same way as the above equation (1). This linear gradient $\Delta K$ is compared with the allowable value Klimit. When it is larger than the allowable value, the compensation amount for the compensator 11 is determined as $-\Delta K$, which may be provided as a control amount. It is also the same as the embodiment (1) in that this control is repeated until the linear gradient $\Delta K$ becomes equal to or less than the allowable value Klimit.

Figure 6A:
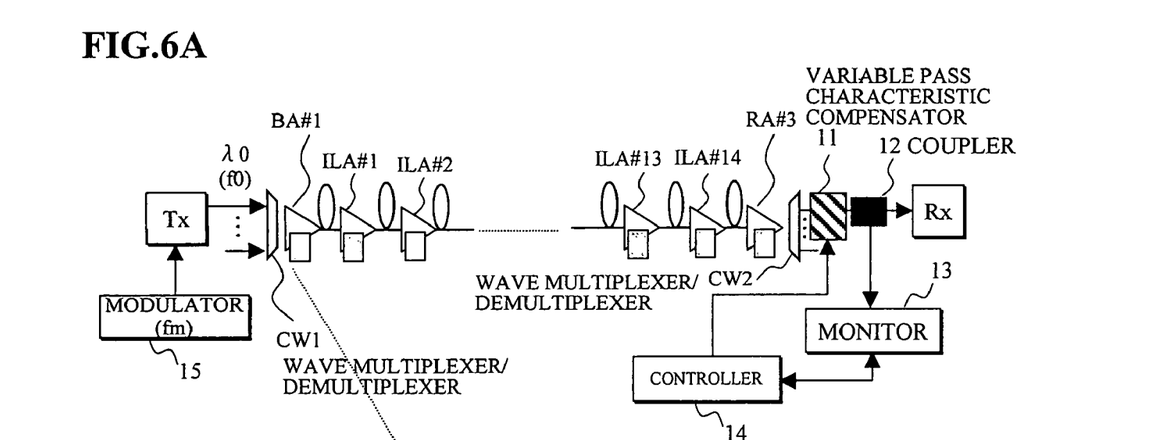
FIGS. 6A-6C are diagrams showing an embodiment [2] of an optical transmission system according to the present invention.

The above-mentioned embodiment [1] of the present invention does not assume that a specific signal is transmitted from the transmission side. Even such a case enables a non-flat pass characteristic to be detected and compensated. However, in an embodiment [2] of the present invention shown in FIGS. 6A-6C, a modulator 15 is preliminarily provided on the transmission side as shown in FIG. 6A, a modulation of a frequency fm is applied to the transmission signal (wavelength $\lambda 0$, frequency f0), and based on this, the compensation of the non-flat pass characteristic the same as the above is performed.

Figure 6B:
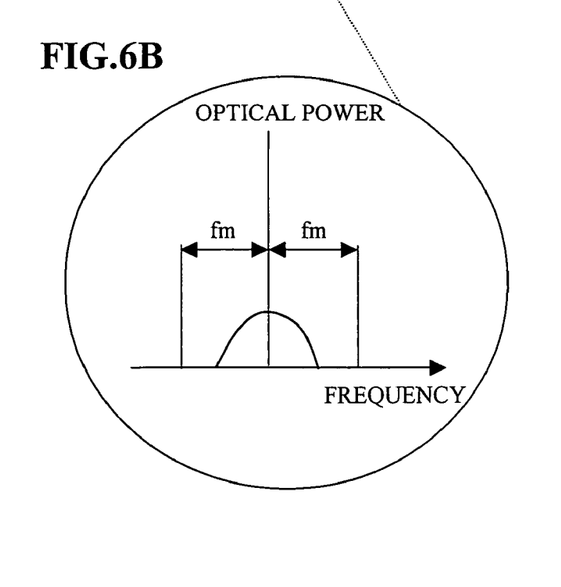
Figure 6C:
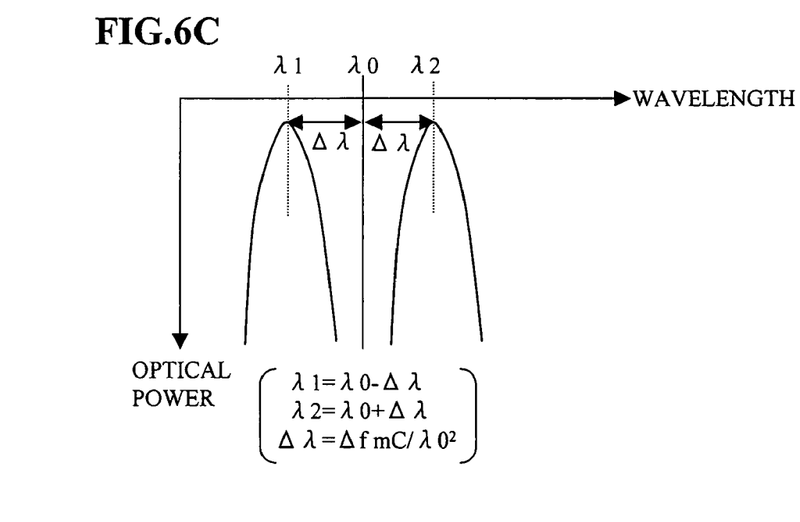

For this reason, as shown in FIG. 6B, when the modulation of the frequency fm is applied to the transmission signal, an optical power of the modulation wave occurs at a wavelength apart by $\Delta\lambda$ (see FIG. 6C) corresponding to the frequency fm from the peak wavelength $\lambda 0$ on the transmission signal.

Therefore, this power may be extracted by the embodiments of the above-mentioned monitors.

Namely, in either case where the embodiment (1) of the monitor shown in FIG. 2 is adopted or the embodiment (2) of the monitor shown in FIGS. 4A and 4B is adopted, the linear gradient $\Delta K$ of the spectrum shown in FIG. 3A is determined. So long as the linear gradient $\Delta K$ exceeds the allowable value Klimit, the compensation amount $-\Delta K$ is provided to the compensator 11 by the controller 14, whereby the optical spectrum without distortion after compensation as shown in FIG. 3D can be obtained.

Figure 7A:
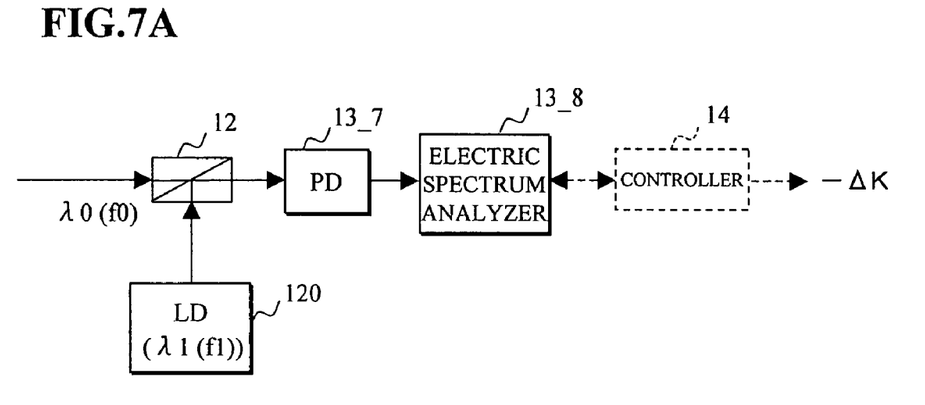
FIGS. 7A and 7B are diagrams showing an embodiment (3) of a monitor used for an optical transmission system according to the present invention.
Figure 7B:
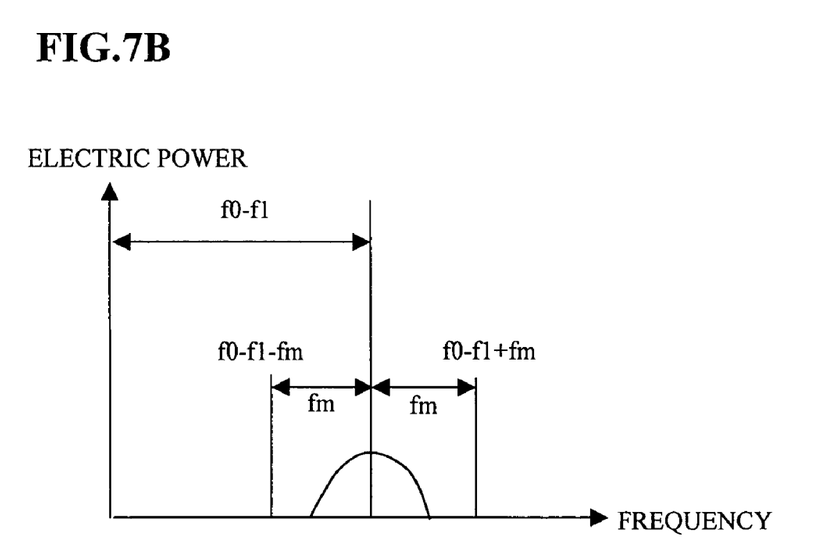

FIGS. 7A and 7B show an embodiment (3) of the monitor 13 used in FIG. 6A. While the optical spectrum analyzer or the optical filter is used in the above-mentioned embodiments (1) and (2) of the monitor, an electric spectrum analyzer is used in the embodiment (3).

Namely, as an example of the monitor 13 in the embodiment (3), a laser diode 120 as a local oscillator is connected to the coupler 12 as shown in FIG. 7A. An output signal received at a photo diode 13_7 assumes an output of frequencies f0-f1 as shown in FIG. 7B, since the optical signal from the laser diode 120 has the wavelength $\lambda 1$ (frequency f1).

However, since an intensity modulation is applied to the transmission signal with the frequency fm by the modulator 15 as shown in FIG. 6A in this embodiment, an optical power of the modulation wave is to arise on both sides for the frequency fm around the frequencies f0-f1, as shown in FIG. 7B, in an electric spectrum outputted from the coupler 12 after a heterodyne detection.

Accordingly, if the output signal of the coupler 12 is transmitted to an electric spectrum analyzer 13_8 after having been converted into an electric signal by the photo diode 13_7, this spectrum analyzer 13_8 performs the same operation as the optical spectrum analyzer 13_1 shown in FIG. 2 under the control of the controller 14, whereby the compensation amount $-\Delta K$ is provided to the compensator 11 from the controller 14 in the same way as the above.

Figure 8:
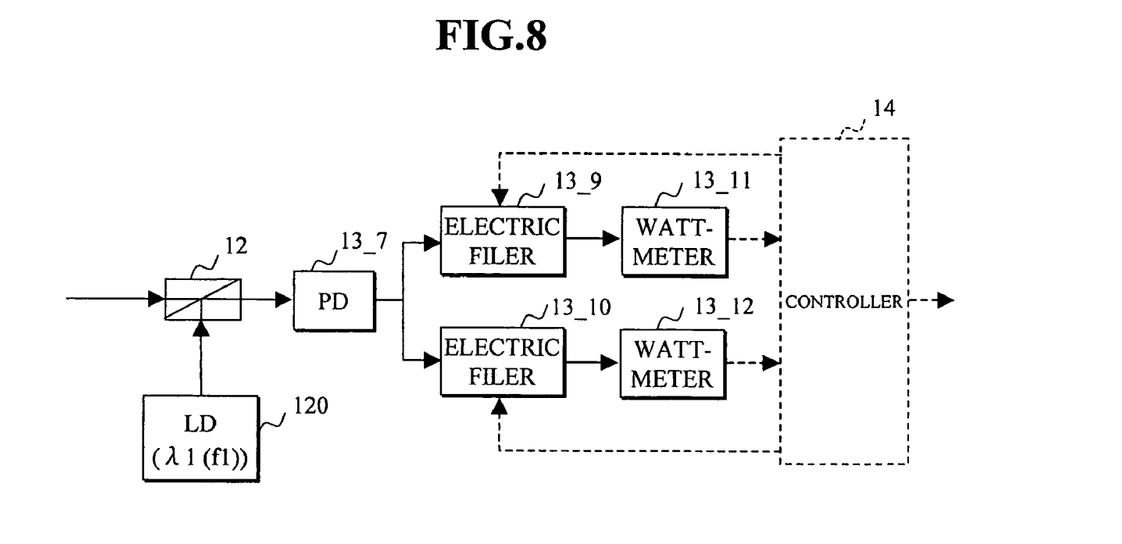
FIG. 8 is a diagram showing an embodiment (4) of a monitor used for an optical transmission system according to the present invention.

Also, in case of an embodiment (4) of the monitor 13 shown in FIG. 8, two electric filters 13_9 and 13_10 are used instead of the electric spectrum analyzer 13_8 of FIG. 7A, and the output signals are outputted to the controller 14 through wattmeters 13_11 and 13_12.

Namely, in the embodiment of the monitor 13 shown in FIG. 8, the electric –filters 13_9 and 13_10 respectively correspond to the optical filters 13_3 and 13_5 shown in FIG. 4A, and the wattmeters 13_11 and 13_12 respectively correspond to the photo diodes 13_4 and 13_6 shown in FIG. 4A. The embodiment of FIG. 8 is different from that of FIG. 4 in that processing is performed by the electric signal instead of the optical signal.

Figure 9A:
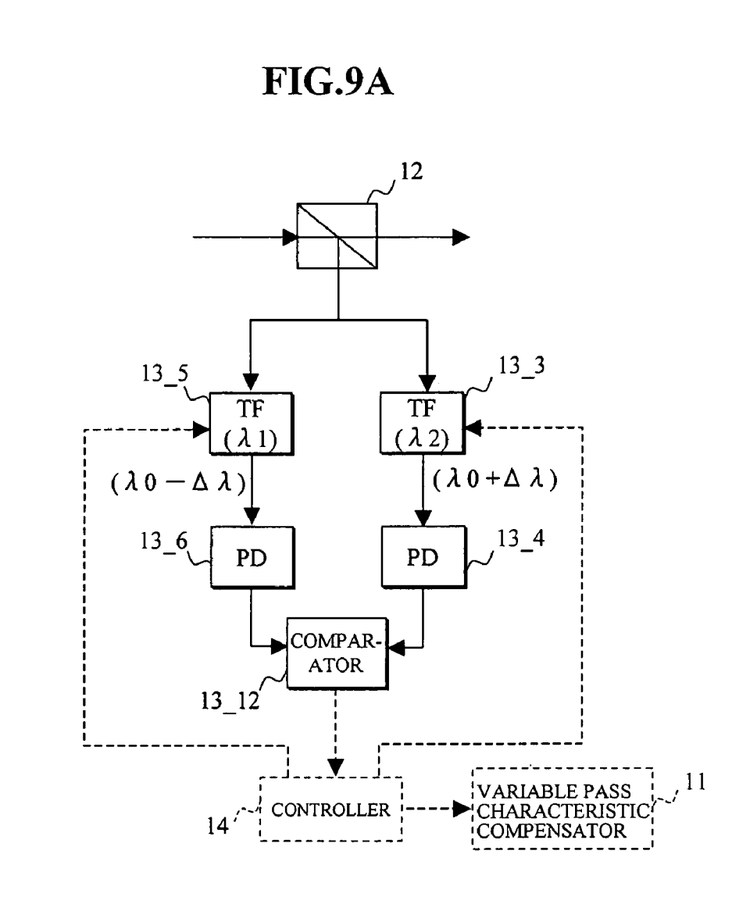
FIGS. 9A and 9B are diagrams showing an embodiment (5) of a monitor used for an optical transmission system according to the present invention.
Figure 9B:
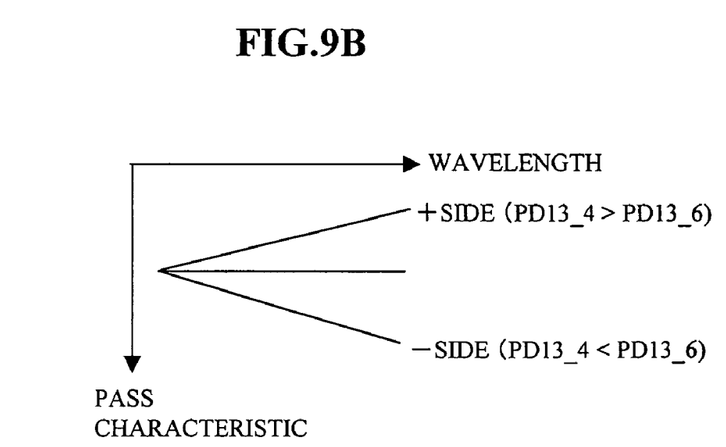

FIGS. 9A and 9B show an embodiment (5). This embodiment is especially different from the embodiment (2) of FIG. 4A in that a comparator 13_12 is provided between the photo diodes 13_4, 13_6 and the controller 14. The output signals of the photo diodes 13_4 and 13_6 are transmitted to the controller 14 through the comparator 13_12.

Namely, in case of the embodiment (5) of the monitor, an output level difference between the photo diodes 13_4 and 13_6 is detected by the comparator 13_12. This output level difference is provided to the controller 14.

The controller 14 includes a variety of variable pass characteristics as shown in FIG. 9B. When e.g. the output level is on the positive (+) side, i.e. when the output level of the photo diode 13_4 is higher than that of the photo diode 13_6 with the output signal of the comparator 13_12 being made a parameter, the controller 14 provides the upward compensation amount ($\Delta K$) to the variable pass characteristic compensator 11. Otherwise the controller 14 provides the downward compensation amount ($-\Delta K$).

Figure 10:
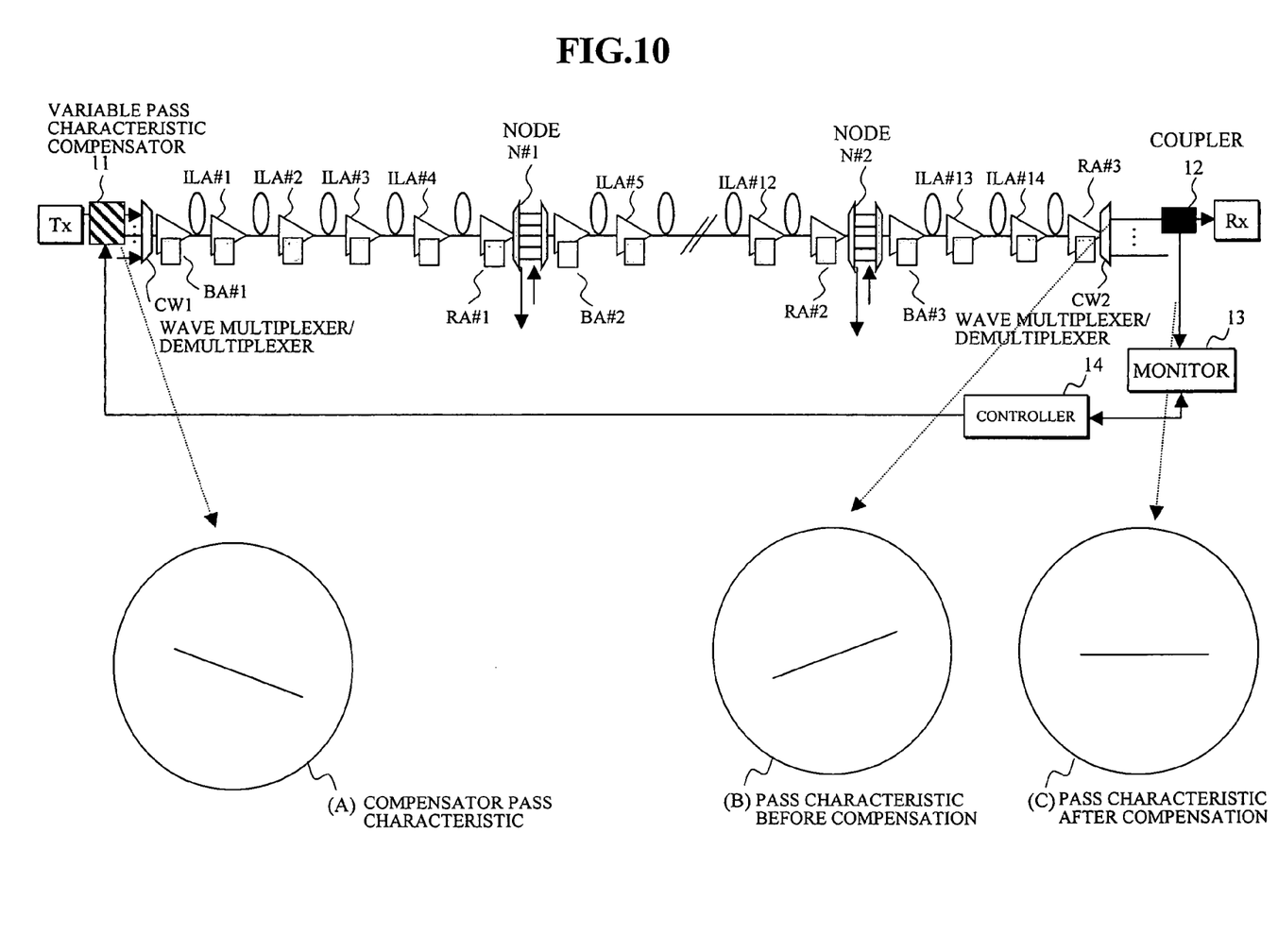
FIG. 10 is a diagram showing an embodiment [3] of an optical transmission system according to the present invention.

While compensation of the pass characteristic is performed only at the receiving end where the receiver Rx is set in the above-mentioned embodiments [1] and [2] of the present invention, it is different in an embodiment [3] of the present invention shown in FIG. 10 in that the variable pass characteristic compensator 11 is provided on the transmission side, i.e. between the transmitter Tx and the wave multiplexer/demultiplexer CW1 in this example.

In this embodiment [3], the compensation of the non-flat characteristic can be performed in exactly the same way as the above-mentioned embodiments [1] and [2]. Namely, the monitor 13 and the controller 14 determine the compensation amount based on an optical spectrum (B) before compensation in the wave multiplexer/demultiplexer CW2, and control the variable pass characteristic compensator 11 to have a pass characteristic (A), whereby obtaining a spectrum (C) after compensation.

Figure 11:
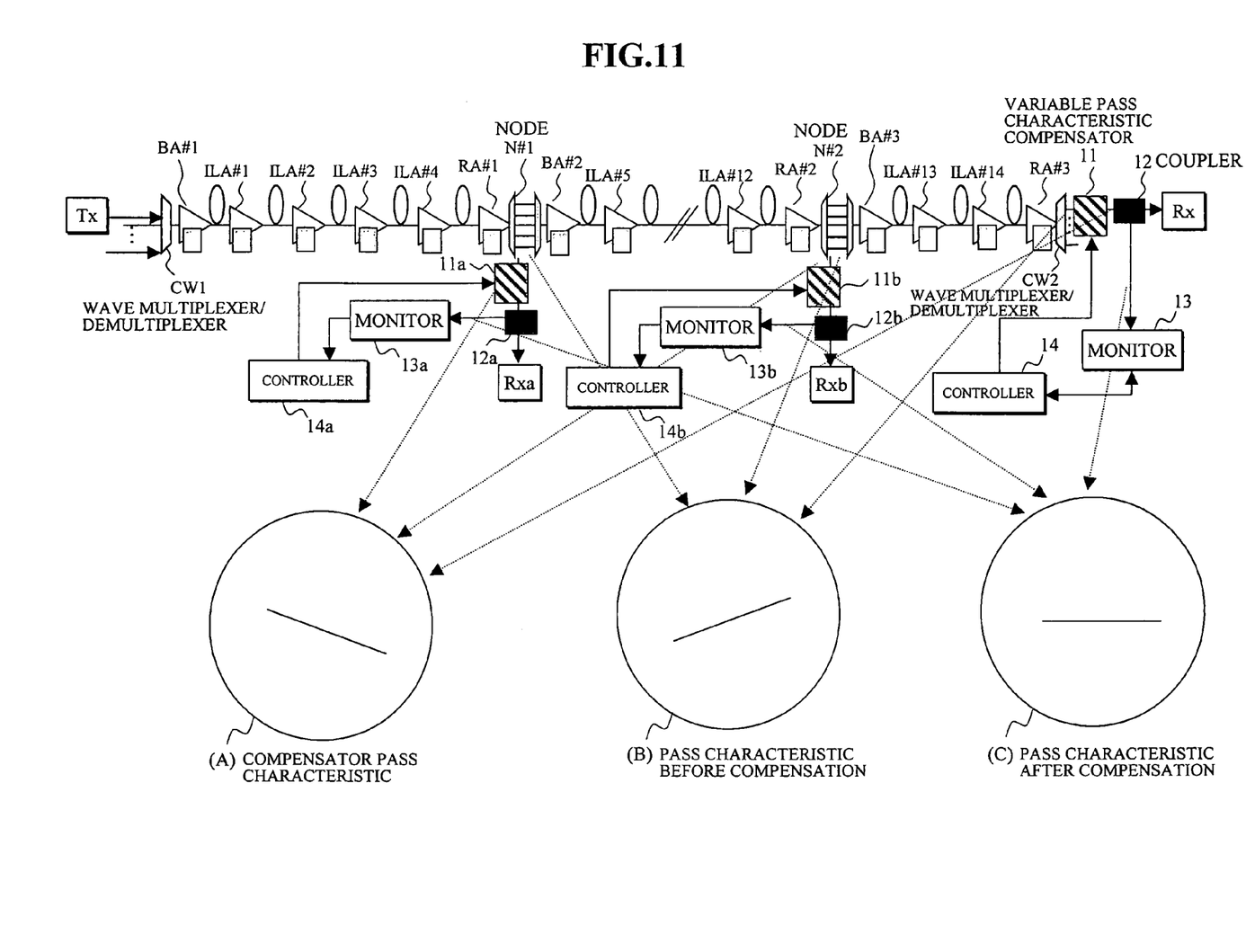
FIG. 11 is a diagram showing an embodiment [4] of an optical transmission system according to the present invention.

Furthermore, as shown in an embodiment [4] of FIG. 11, the variable pass characteristic compensator 11 can be arranged not only on the receiving side or the transmitting side, but also at intermediate nodes N#1 and N#2.

Namely, a receiver Rxa is provided at the intermediate node N#1, a coupler 12a is provided before the receiver Rxa. This coupler 12a controls a variable pass characteristic compensator 11a provided between the coupler 12a and the intermediate node N#1 through a monitor 13a and a controller 14a, thereby enabling the compensation of the non-flat pass characteristic up to the intermediate node N#1.

This also applies to the intermediate node N#2. In this case, as shown in FIG. 11, a coupler 12b, a monitor 13b, a controller 14b, and a variable pass characteristic compensator 11b are provided, thereby realizing the compensation of the spectrum.

It is to be noted that for the above-mentioned variable pass characteristic compensator, general-purpose devices of a waveguide type, an Mems type, a micro optics type using a nonreciprocal element, and the like can be employed.

As described above, an optical transmission system according to the present invention is arranged such that a spectrum of a dropped optical signal within a modulation band per channel is monitored, and non-flatness for the optical signal is compensated by detecting the non-flatness of a pass characteristic of a transmission line from the spectrum. Therefore, it becomes possible to compensate the non-flatness pass characteristic within the modulation band in a wavelength multiplexing optical transmission system, and to avoid a transmission characteristic deterioration by a waveform distortion of an optical spectrum occurring from the non-flatness pass characteristic.

What we claim is:

1. An optical transmission system comprising:
   a drop portion for dropping an optical signal;
   a monitor for monitoring a spectrum of the dropped optical signal within a modulation band per channel;
   a controller for detecting non-flatness of a pass characteristic of a transmission line from the spectrum; and
   a compensator for compensating the non-flatness for the optical signal, wherein the monitor comprises an optical spectrum analyzer, and the controller detects the non-flatness by determining a linear gradient of a spectrum around a peak wavelength, determined by sweeping the optical spectrum analyzer.

2. The optical transmission system as claimed in claim 1 wherein the compensator is provided on a reception side or a transmission side of the optical signal.

3. The optical transmission system as claimed in claim 2 wherein the reception side comprises an arbitrary intermediate node.

4. The optical transmission system as claimed in claim 2 wherein the compensator comprises a variable pass characteristic compensator.

5. The optical transmission system as claimed in claim 1 wherein the compensator comprises a variable pass characteristic compensator.

6. An optical transmission system comprising:
a drop portion for dropping an optical signal;
a monitor for monitoring a spectrum of the dropped optical signal within a modulation band per channel;
a controller for detecting non-flatness of a pass characteristic of a transmission line from the spectrum; and
a compensator for compensating the non-flatness for the optical signal, wherein the monitor is composed of a coupler for further dropping the optical signal from the drop portion, two tunable filters for sweeping the optical signal from the coupler and for respectively extracting an optical signal component a fixed wavelength width apart around a peak wavelength, and two photo diodes for detecting power of an output optical signal of the tunable filters to be provided to the controller.

7. The optical transmission system as claimed in claim 6 wherein the monitor includes a comparator for detecting an output level difference between the photo diodes, and the controller controls the compensator so that an output level of the comparator assumes zero.

8. The optical transmission system as claimed in claim 6, further comprising a modulator, on a transmission side, for applying to the optical signal an intensity modulation of a predetermined frequency for monitoring,
the filters being set to extract an optical signal component the fixed wavelength width corresponding to the predetermined frequency apart from the peak wavelength by the fixed wavelength width corresponding to the predetermined frequency.

9. An optical transmission system comprising:
a drop portion for dropping an optical signal
a monitor for monitoring a spectrum of the dropped optical signal within a modulation band per channel;
a controller for detecting non-flatness of a pass characteristic of a transmission line from the spectrum;
a compensator for compensating the non-flatness for the optical signal,
a modulator, on a transmission side, for applying to the optical signal an intensity modulation of a predetermined frequency for monitoring, and
a laser diode connected to the drop portion to perform a heterodyne detection,
the monitor being composed of a photo diode for inputting an optical signal, from the drop portion, of a wavelength detected by a heterodyne detection, and an electric spectrum analyzer for determining powers of at least two electric signals a fixed frequency width apart around a peak frequency determined by sweeping an electric signal outputted from the photo diode, to be provided to the controller.

10. An optical transmission system comprising:
a drop portion for dropping an optical signal;
a monitor for monitoring a spectrum of the dropped optical signal within a modulation band per channel;
a controller for detecting non-flatness of a pass characteristic of a transmission line form the spectrum;
a compensator for compensating the non-flatness for the optical signal,
a modulator, on a transmission side, for applying to the optical signal an intensity modulation of a predetermined frequency for monitoring, and
a laser diode connected to the drop portion to perform a heterodyne detection,
the monitor being composed of a photo diode for inputting an optical signal, from the drop portion, of a wavelength detected by a heterodyne detection, two electric filters for respectively extracting an electric signal component a fixed frequency width apart around a peak frequency determined by sweeping an electric signal outputted from the photo diode, and two wattmeters for determining powers of output signals from the electric filters to be provided to the controller.

* * * * *